UNITED STATES PATENT OFFICE.

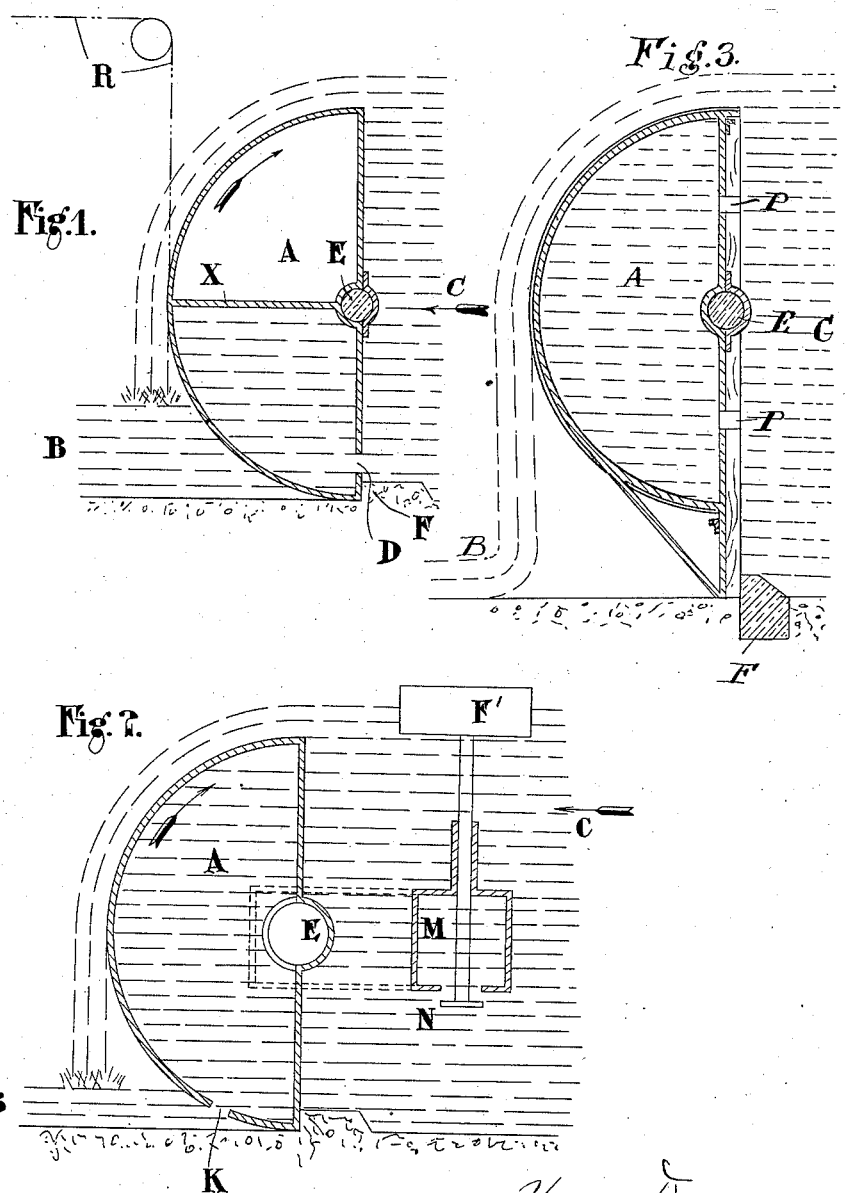

HENRY DAVEY, OF CONAWAYS, EWELL, ENGLAND.

WEIR AND FLOOD-GATE.

1,040,159.  Specification of Letters Patent.  Patented Oct. 1, 1912.

Application filed December 1, 1911. Serial No. 663,470.

*To all whom it may concern:*

Be it known that I, HENRY DAVEY, a subject of the King of Great Britain and Ireland, and a resident of Conaways, Ewell, in the county of Surrey, England, have invented a certain new and useful Weir and Flood-Gate, of which the following is a specification.

The invention relates to weirs and flood gates, and has for object to provide an improved form of such a device which can be readily operated by hand or can be adapted to work automatically.

With this object the invention consists in a hollow weir or flood gate with its center of gravity on the tail water side of the horizontal axis about which it is rotatable and having a cylindrical surface co-axial with such axis and disposed toward the tail water.

The invention also consists in a gate of semi-cylindrical shape mounted to rotate about a horizontal axis and disposed with its flat face toward the head water and its cylindrical face toward the tail water.

The invention further consists in the improved weir or flood gates and adjuncts therefor hereinafter described.

A gate of the shape described may be nearly balanced for large variations of level in both the head and tail water and may therefore be easily actuated by hand or it may be made automatic in opening and closing by means of a simple device.

Referring to the accompanying drawings, Figure 1 shows a cross section through a gate according to the present invention arranged to be operated by hand; Fig. 2 shows a modified form adapted to be operated automatically, while, Fig. 3 shows another automatically operated modification.

The drawings are of a diagrammatic nature while similar parts in the different drawings are denoted by the same reference symbols.

In carrying the invention into effect according to one form (see Fig. 1) the gate, A, mounted on the shaft, E, takes the form of a semi-cylindrical vessel arranged with its flat face toward the head water, C, and its cylindrical face toward the tail water, B. The interior space of the gate, A, is divided into two compartments by a partition, X, while a hole, D, is provided in the flat face of the gate so that water from the head race may enter and fill the lower compartment. The water in the tail race B, does not tend to keep the gate closed, *i. e.* with its lower edge butting against the stop, F, as shown because all the pressures on the cylindrical surface are radial and the pressure of the tail water has therefore no moment about the axis of the shaft, E. Similarly the pressures on the interior of the cylindrical surface being also radial have likewise no moment about the axis of the shaft, E. Since the pressures on each side of the lower half of the flat surface are balanced, the only remaining forces of importance are the upward pressure of the head water on the underside of the partition, tending to open the gate and the pressure on the upper half of the flat surface tending to close it; the weight of the gate in relation to these pressures is made to be just sufficient to keep the gate closed. Any ordinary means may then be used to open the gate, such as a chain, R, passing over a pulley and attached to the gate.

According to the modification shown in Fig. 2, the gate is of the same general construction as in Fig. 1, but provision is made for causing the gate to open and close automatically with a rise and fall of head water. The partition, X, and the hole, D, in Fig. 1 are omitted and a hole, K, is provided so that any water which enters the gate may flow out into the tail race. The shaft, E, is hollow and water is admitted into the gate from the head race through the valve, N, the passage, M, and the hollow shaft, E, the valve, N, being so proportioned as to admit water faster than it can run out through the hole K. The valve, N, is controlled by means of the float, F'. When the water in the head race is high, the float, F', closes the valve, N, and the water issuing out at K, the gate becomes empty, or partly so and opens, but when the water falls, the float F falls likewise and opens the valve N admitting water to fill the gate and close it.

Another modification is shown in Fig. 3, the gate being of the same general form as in Figs. 1 and 2 but opening and closing automatically without the float device shown in Fig. 2. According to this modification the flat face of the gate is extended at O beyond the cylindrical face, holes, P, P, being provided as shown. The result is that the semi-cylindrical part of the gate is in equilibrium since the pressures on the curved surface are radial, while they are equal and opposite on the flat face. The only pressure tending to open the gate is therefore that acting on the part O, and the weight of the gate is made to balance this pressure of normal water level. An increase in the head of the race, C, then puts additional pressure on the part, O, and the gate opens, while with the return of head water to the normal the gate closes.

I claim—

1. In combination, a float sluice or flood gate having an outlet and an inlet; means controlling said inlet and automatic means responsive to rise of head water for closing said inlet-controlling means.

2. In combination, a float sluice or flood gate closed by weight of contained water and automatic means responsive to rise of head water for lifting said gate, said means including a controlled inlet for said contained water.

3. In combination, a float sluice or flood gate having an opening to the tail water; an inlet from the head water and automatic means responsive to rise of head water for closing said inlet and thereby increasing the buoyancy of said gate by out-flow of water through said opening.

4. In combination, a float sluice or flood gate having an outlet and an inlet operatively larger than said outlet and automatic means for controlling said inlet.

5. A weir or flood gate having a hollow portion with the form of a semi-cylinder and a duct between its interior and the head water.

6. A weir or flood gate having a hollow portion with the form of a semi-cylinder mounted rotatably about its axis and a stop against which an edge of the semi-cylinder butts when the gate is closed.

7. A weir or flood gate having a hollow portion with the form of a semi-cylinder and mounted rotatably about the axis of said cylinder.

8. A weir or flood gate having a hollow portion with the form of a semi-cylinder rotatably mounted about a horizontal axis and with its center of gravity and its cylindrical surface both disposed toward the tail water when the gate is closed.

9. A weir or flood gate having a hollow portion with the form of a semi-cylinder and mounted rotatably with its flat face toward the head water and its cylindrical face toward the tail water.

10. A weir or flood gate rotatably mounted about a horizontal axis and having a hollow portion with the form of a co-axial cylindrical sector part of which is in contact with the tail water when the gate is closed.

11. A weir or flood gate rotatably mounted about a horizontal axis and having a hollow portion with the form of a co-axial cylindrical sector, the curved surface of which extends through at least a quadrant of a circle reckoned from a point vertically below said axis toward the tail water when the gate is closed.

In testimony whereof I have signed my name to this specification in the presence of two subscribing witnesses.

HENRY DAVEY.

Witnesses:
BERTRAM H. MATTHEWS,
P. A. OUTHWAITE.